United States Patent
Wen et al.

(10) Patent No.: US 9,684,904 B2
(45) Date of Patent: Jun. 20, 2017

(54) ISSUE RESPONSE AND PREDICTION

(71) Applicant: eBay Inc., San Jose, CA (US)

(72) Inventors: Ping Wen, Sunnyvale, CA (US); Albert Bustos, Union City, CA (US); Baback Nemazie, San Jose, CA (US); Prakasam Kannan, Mountain View, CA (US); Shahid Ali, San Francisco, CA (US); Brenda Tooman, West Jordan, UT (US)

(73) Assignee: eBay Inc., San Jose, CA (US)

( * ) Notice: Subject to any disclaimer, the term of this patent is extended or adjusted under 35 U.S.C. 154(b) by 73 days.

(21) Appl. No.: 14/551,042

(22) Filed: Nov. 23, 2014

(65) Prior Publication Data
US 2015/0371236 A1  Dec. 24, 2015

Related U.S. Application Data

(60) Provisional application No. 62/014,369, filed on Jun. 19, 2014.

(51) Int. Cl.
*G06Q 30/00* (2012.01)
(52) U.S. Cl.
CPC ................... *G06Q 30/016* (2013.01)
(58) Field of Classification Search
CPC .................................................. G06Q 30/016
See application file for complete search history.

(56) References Cited

U.S. PATENT DOCUMENTS

| 2006/0031177 A1* | 2/2006 | Rule | G06Q 10/10 705/309 |
| 2011/0112869 A1* | 5/2011 | Greak | G06Q 30/06 705/4 |

FOREIGN PATENT DOCUMENTS

WO   WO-2015195902 A1   12/2015

OTHER PUBLICATIONS http://www.amazon.com/, "Your Account" link and "Your Orders" link.*
http://www.amazon.com/ "Your Account" link and "Your Orders" link.*
"International Application Serial No. PCT/US2015/036411, International Search Report mailed Sep. 17, 2015", 2 pgs.
"International Application Serial No. PCT/US2015/036411, Written Opinion mailed Sep. 17, 2015", 6 pgs.

* cited by examiner

*Primary Examiner* — Kristy A Haupt
(74) *Attorney, Agent, or Firm* — Schwegman, Lundberg & Woessner, P.A.

(57) ABSTRACT

Systems and methods of presentation of a response related to a dispute element are herein disclosed. A request from a device associated with a first user is received. The request including a request to access a customer service page with information related to a transaction between the first user and a second user. Transaction characteristics of the transaction and user characteristics of the first user may be identified. A dispute element associated with the transaction is detected based on the transaction characteristics and the user characteristics of the first user. A response related to the detected dispute element is generated. Presentation of the response related to the detected dispute element is caused.

18 Claims, 9 Drawing Sheets

ISSUE RESPONSE AND PREDICTION

RELATED APPLICATION

This patent application claims the benefit of priority, under 35 U.S.C. Section 119(e), to Ping Wen et al., U.S. Provisional Patent Application Ser. No. 62/014,369, entitled "SYSTEMS AND METHODS TO DETECT ISSUES RELATED TO A TRANSACTION BETWEEN BUYERS AND SELLERS," filed on Jun. 19, 2014, which is hereby incorporated by reference herein in its entirety.

TECHNICAL FIELD

The subject matter disclosed herein generally relates to data processing and presentation. Specifically, the present disclosure addresses systems and methods to facilitate presentation of a response to an issue related to a transaction. In some examples, issues are predicted and data is processed and presented accordingly.

BACKGROUND

A user may access a customer service page in order to seek help or resolve an issue. The customer service page may be hosted by a server. Moreover, the user may provide a description of the issue when accessing the customer service page.

BRIEF DESCRIPTION OF THE DRAWINGS

Some embodiments are illustrated by way of example and not limitation in the figures of the accompanying drawings.

DETAILED DESCRIPTION

Example methods and systems are directed to presenting a response to an issue related to a transaction. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one example, a user accesses a customer service page in order to receive assistance related to an issue that the user may be experiencing in a transaction with another user. A system including the service page can be used to detect or "predict" the issue before the user even provides a description about the issue. This can relieve the user of having to specify the issue for which assistance is sought. Moreover, in some cases, the user may not even be aware of the issue and the system can be used to detect the issue and provide information that is helpful to the user. This can improve the overall efficiency of the customer service web page in resolving user issues regarding transactions. In some cases, this helps to avoid user confusion about the issue being experienced and the assistance being provided. Accordingly, one or more of the methodologies discussed herein can obviate a need for additional searching or navigation of the customer service page by the user, and has the technical effect of reducing computing resources used by one or more devices within the system. Examples of such computing resources include, without limitation, processor cycles, network traffic, memory usage, storage space, and power consumption.

Figure 1:
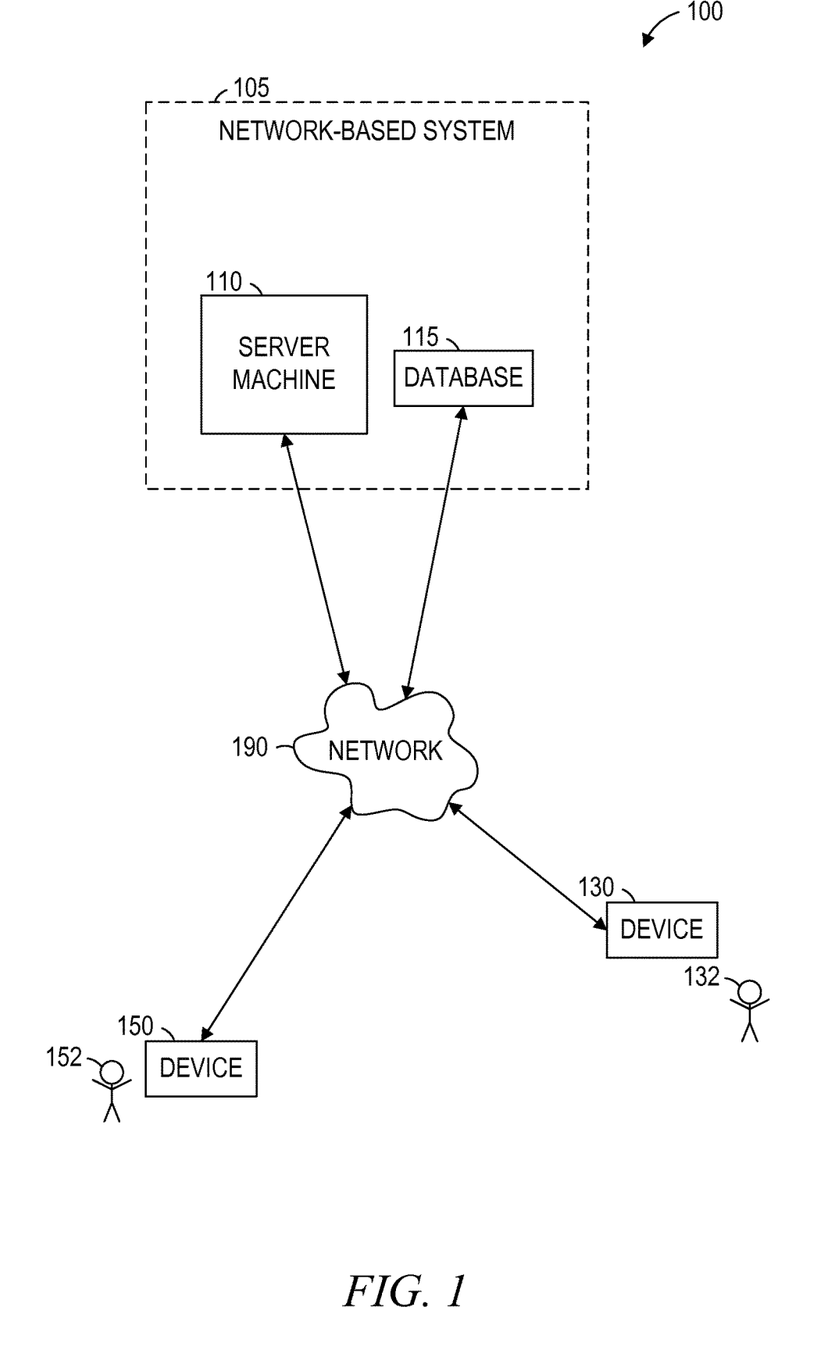
FIG. 1 is a network diagram illustrating a network environment suitable for presentation of a response to an issue related to a transaction, according to some example embodiments.

FIG. 1 is a network diagram illustrating a network environment 100 suitable for presentation of a response to an issue related to a transaction, according to some example embodiments. The network environment 100 includes a server machine 110, a database 115, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 9.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 is or can include a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
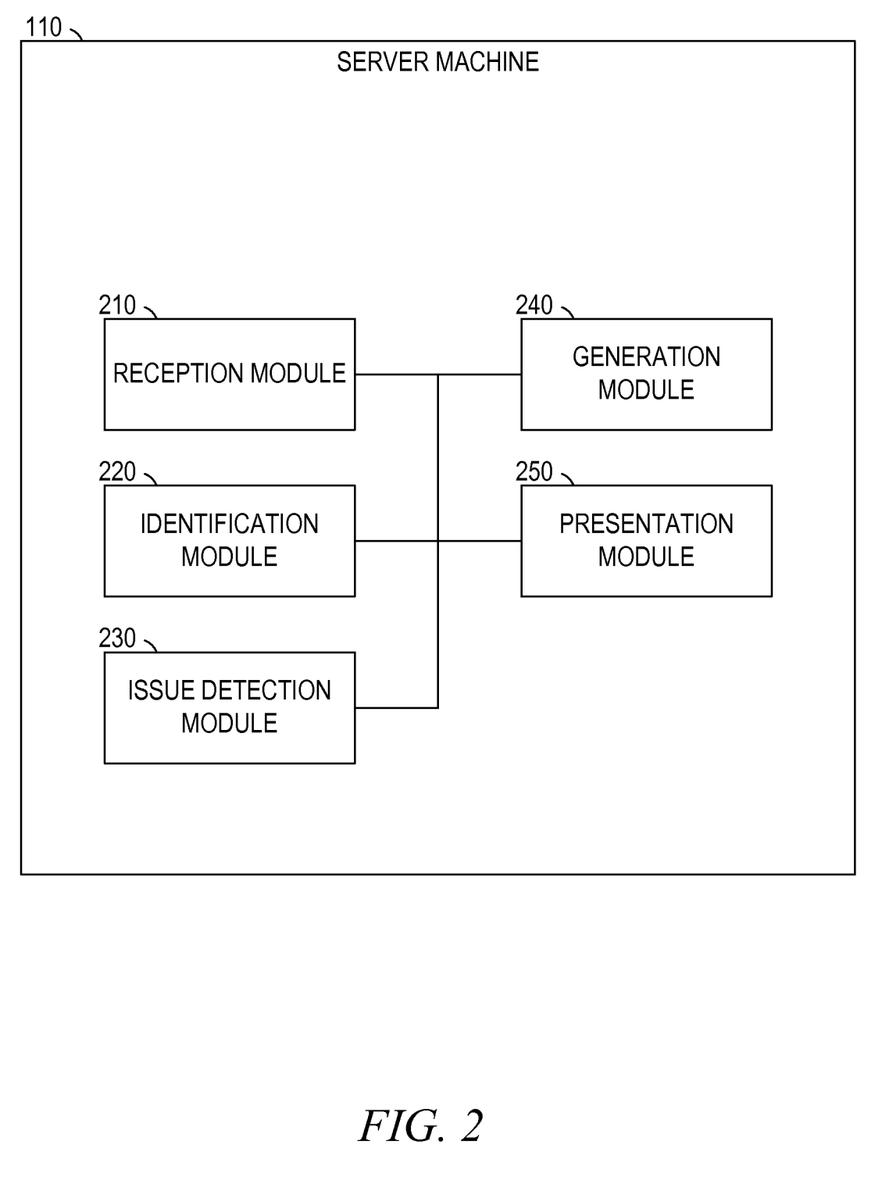
FIG. 2 is a block diagram illustrating components of a server machine suitable for presentation of a response to an issue related to a transaction, according to some example embodiments.

FIG. 2 is a block diagram illustrating components of the server machine 110, according to some example embodiments. The server machine 110 is shown as including a reception module 210, an identification module 220, an issue detection module 230, a generation module 240, and a presentation module 250, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the reception module 210 is configured to receive a request from a device associated with a first user (e.g., user 132). The request may include a request to access a customer service page with information related to a transaction between the first user and a second user (e.g., user 152). For instance, the customer service page may provide information that is used to resolve issues that may arise during a course of a transaction. Moreover, any parties to the transaction may access the customer service page to receive assistance regarding an issue. Therefore, the first user may request access to the customer service page in order to receive assistance regarding an issue that the first user is experiencing in the transaction between the first user and the second user. In some cases, the issue may not have yet occurred and the server machine 110 may predict the issue that will arise during the course of the transaction or as the transaction progresses, as further explained below. Moreover, the transaction may involve the transaction of an item that is sold by the first user and purchased by the second user or vice versa. In some instances, the issue may be that the second user did not receive the item. In some instances, the issue may be that the first user did not receive payment from the second user for the item. In other instances, the issue may also be regarding any procedural questions about the transaction between the first user and the second user. In some instances, the issue may not be related to a specific transaction. For example, the issue may be related to performance of a seller or a buyer in previous transactions.

In various example embodiments, the reception module 210 is further configured to receive browsing activity of the first user with the customer service page from the device associated with the first user. The browsing activity may comprise interactions of the first user with the customer service page that is displayed on the device associated with the first user. The browsing activity may include web page views on the customer service page. The browsing activity may also include navigational information with respect to the customer service page such as links from the customer service page that are selected by the first user. For instance, the selection of a link or a topic on the customer service page may be included as part of the browsing activity.

In various example embodiments, the reception module 210 is further configured to receive feedback regarding the second user in the current transaction with the first user or in a previous transaction. The reception module 210 may also receive feedback regarding the first user in the current transaction with the second user or in a previous transaction. The feedback may be received from a third party. As further explained below, the feedback received may be used by the issue detection module 230 in detecting the issue that arises from the transaction between the first user and the second user.

In various example embodiments, the identification module 220 is configured to identify transaction characteristics of the transaction between the first user and the second user. The transaction characteristics may indicate an event that occurs during the transaction. Accordingly, the identification module 220 may be further configured to identify the event that occurs during the transaction. An event may include an item being sold or purchased, an item being shipped, a claim being made for an item, a claim being escalated by a user, a purchase of an item, transfer of currency, and the like. Also, for transactions that have not yet completed or are still in progress, the transaction characteristics may indicate a current stage of that transaction. Other examples of transaction characters may also include a type of transaction and pending actions in the transaction. The identification module 220 may be further configured to identify user characteristics of the first user or the user characteristics of the second user. The user characteristics may indicate an amount of experience of the user in previous transactions. Therefore, the identification module 220 may determine the frequency at which the first user engages in transactions with other users. The user characteristics may further indicate how the user has behaved in previous transactions. Therefore, the identification module 220 may identify the behavior of the first user or the second user in previous transactions. Other examples of user characteristics may include type of user, status of the user, actions performed by the user, tendencies of the user, account status of the user, and the like. Therefore, the identification module 220 may be further configured to access account information of the first user or the second user from a database (e.g., database 115).

In various example embodiments, the server machine 110 is configured to perform a rule-based detection of an issue. For instance, a list of detectable issues may be managed by the server machine 110 and stored in the database 115. Further, one or more rules may indicate pre-defined criteria for each of the detectable issues. In other words, a rule may set forth a set of pre-defined criteria that correspond to an issue from the list of detectable issues. Moreover, the transaction characteristics and the user characteristics may be used in determining whether the set of pre-defined criteria is satisfied, as further explained below.

In various example embodiments, the issue detection module 230 is configured to detect an issue that arises from the transaction between the first user and the second user based on the transaction characteristics. In some instances, the issue may be dispute element between the first user and the second user. Further, the dispute element may be associated with the transaction between the first user and the second user. The issue detection module 230 may also detect the issue based on the user characteristics of the first user. For the rule-based detection of issues, the issue detection module 230 may determine that at least one of the transaction characteristics or the user characteristics match with the pre-defined criteria that correspond to an issue from the list of detectable issues. The pre-defined criteria may include pre-defined transaction criteria and pre-defined user criteria. The issue detection module 230 may be further configured to detect that a threshold number of the transaction characteristics match with the pre-defined transaction criteria. The issue detection module 230 may also detect that a threshold number of user characteristics match with the pre-defined user criteria. Once a match has been determined, the issue detection module 230 selects the issue from the list of detectable issues. Selection of the issue may include pre-fetching or retrieving the issue from the list of detectable issues that are stored in the database 115. In some instances, each issue from the list of detectable issues is assigned a unique priority value. The priority values may be used to break a tie between two detected issues that have an identical number of matches with the transaction characteristics and the user characteristics. The priority values may also be used to break a tie between one or more detected issues that have identical calculated probability values, as further explained below.

In various example embodiments, the issue detection module 230 is further configured to calculate a value that represents a probability that the issue corresponds to the received request. In doing so, the issue detection module 230 may assign weights to each of the transaction characteristics and the user characteristics and then perform the calculation of the value based on the assigned weights. In some instances, the assigned weights may be modified. For instance, an initial assignment of weights may place a heavier emphasis on certain transaction characteristics over the user characteristics. However, later on, the assignment of weights may be adjusted to prioritize certain user characteristics over the transaction characteristics. The issue detection module 230 may detect the issue based on the calculated value that represents the probability that the issue corresponds to the received request. Moreover, a value may be calculated by the issue detection module 230 for each issue from the list of detectable issues. As stated above, in the case of a tie, the priority values may be used to break the tie between one or more issues with identical calculated probability values.

In various example embodiments, the issue detection module 230 is further configured to detect the issue based on the received browsing activity of the first user. The browsing activity may include the interactions of the first user with the customer service page. For instance, based on the interactions of the first user with the customer service page, the issue detection module 230 may predict an issue that the first user is experiencing in the transaction with the second user. For instance, if the first user is browsing through a section of the customer service page that has information about invoice and billing, the issue detection module 230 may predict that the first user has an issue regarding a payment for the transaction between the first user and the second user. As another example, if the first user is browsing through a section of the customer service page that has information regarding tracking or shipment of an item, the issue detection module 230 may predict that the first user has an issue regarding an item not received for the transaction between the first user and the second user. In some instances, the browsing activity may consist of activities or interactions performed by the first user with other web pages other than the customer service page. As stated above, the prediction of an issue may occur prior to the user providing a description about the issue. In other words, the user may be unaware of the issue and the issue detection module 230 is able to predict the issue which is brought to the attention of the user.

In various example embodiments, the issue detection module 230 is further configured to detect the issue based on the feedback regarding the second user in the previous transaction. The feedback may include information about the behavior or actions of the second user in the previous transaction. For instance, the feedback may indicate that the second user in previous transactions is traditionally late in shipping out the item and therefore, the issue detection module 230 may predict that a similar issue will occur in the current transaction with the first user.

In various example embodiments, the generation module 240 is configured to generate a response that addresses the detected issue. In other words, the response may relate to the detected issue. The response to the detected issue may be used to assist the first user on how to handle the issue that the first user is experiencing in the transaction. For instance, the generation module 240 may generate an indication that is displayed on a portion of the customer service page that corresponds to the detected issue. The indication may be used to guide the first user to navigate to the portion of the customer service page which may contain information helpful to the issue that the first user is currently experiencing. The generation module 240 may also generate a description of a solution that includes instructions on how to resolve the detected issue. For example, if the issue is for an item that the second user has not paid, the generation module 240 may provide a description of steps that the first user may take to receive payment from the second user. The generation module 240 may also generate a picture of an item associated with the transaction. The picture may be used to remind the first user of the item that is currently involved in the transaction with the second user.

In various example embodiments, the presentation module 250 is configured to cause presentation of the response that addresses the detected issue on the device associated with the first user. The response may be displayed on a screen of the device associated with the first user. As stated above, the presented response may include the description of the solution to the detected issue as well as the picture of the item associated with the transaction. Moreover, the presentation module 250 causes presentation of the response that addresses the detected issue without receiving information about the issue from the device associated with the first user.

In other words, the first user does not have to provide explicit information regarding the issue. As stated earlier, in some cases, the first user may not even be aware of the issue. Therefore, the server machine 110 provides assistance to the first user in identifying the issue.

Figure 3:
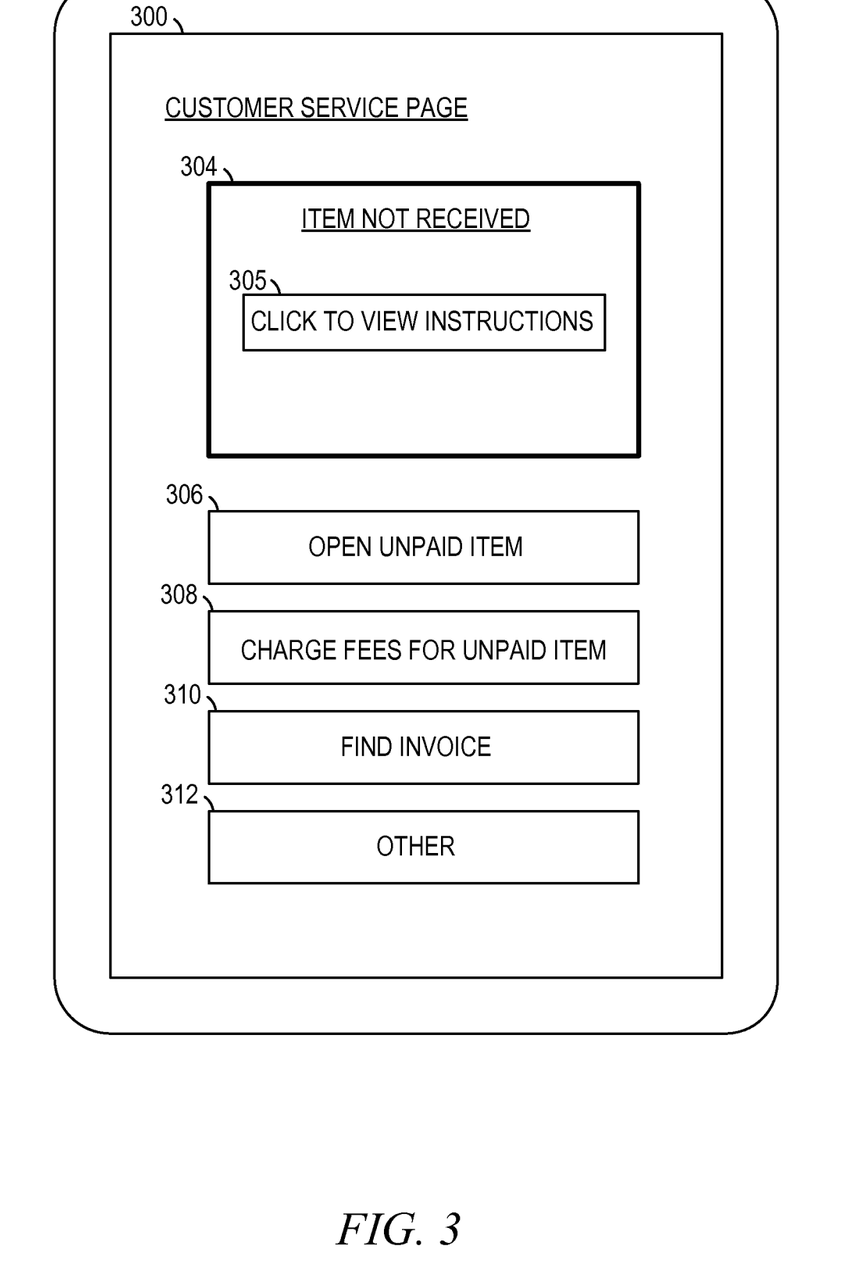
FIG. 3-4 are example user interfaces illustrating a customer service page, according to some example embodiments.

FIG. 3 is an example user interface 300 illustrating a customer service page, according to some example embodiments. The example user interface 300 may be displayed on a device associated with a user. The user viewing the customer service page may be experiencing an issue in a transaction with another user. As such, the customer service page includes a first issue 304, a second issue 306, a third issue 308, a fourth issue 310 and a fifth issue 312. Each of the issues may be displayed within a section of the customer service page. As shown in FIG. 3, the first issue 304 may be highlighted or bolded in order to draw the user's attention. The first issue 304 may be highlighted because the issue detection module 320 may detect that the user is most likely experiencing an issue related to an item not being received. The remaining issues 306, 308, 310, and 312 may not be highlighted because the issue detection module 320 does not detect them as issues pertinent to the user viewing the customer service page. Each of the issues 304, 306, 308, 310, and 312 may be links that are operable to receive more information on how to handle that particular issue.

Figure 4:
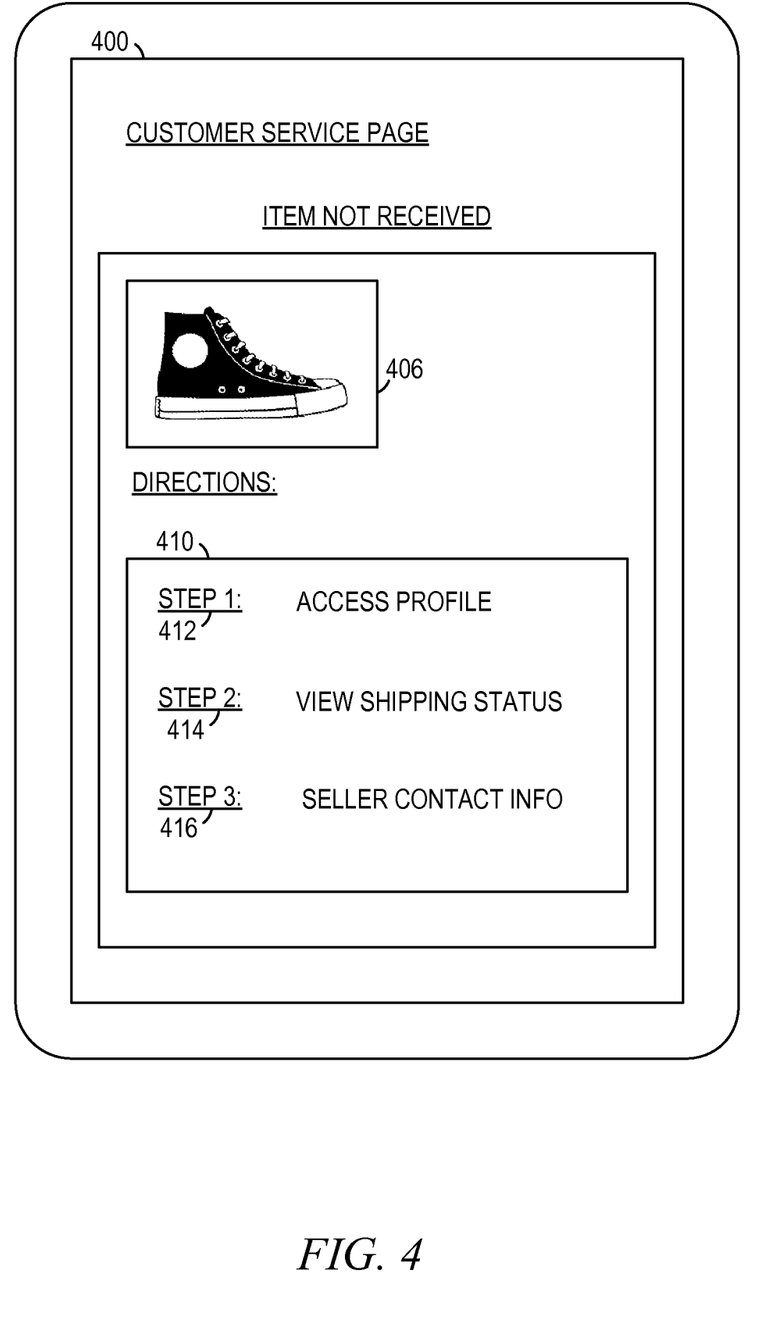

FIG. 4 is an example user interface 400 illustrating a customer service page, according to some example embodiments. The example user interface 400 may be displayed on a device associated with a user. The user viewing the customer service page may be experiencing an issue in a transaction with another user. The example user interface 400 may be displayed after the operation of the link 305 shown in FIG. 3. As shown in FIG. 4, the customer service page may include instructions on how to handle a situation in which an item is not received by the user. The instructions may include a series of steps that is described and displayed underneath section 410 of the example user interface 400. For instance, shown in the example user interface 400 are a first step 412, a second step 414, and a third step 416. Each of the steps 412, 414, and 416 may describe an action that the user may take in order to resolve the issue in which an item is not received. Also included in the user interface 400 may be an image 406 that depicts the item that is not received by the user.

Figure 5:
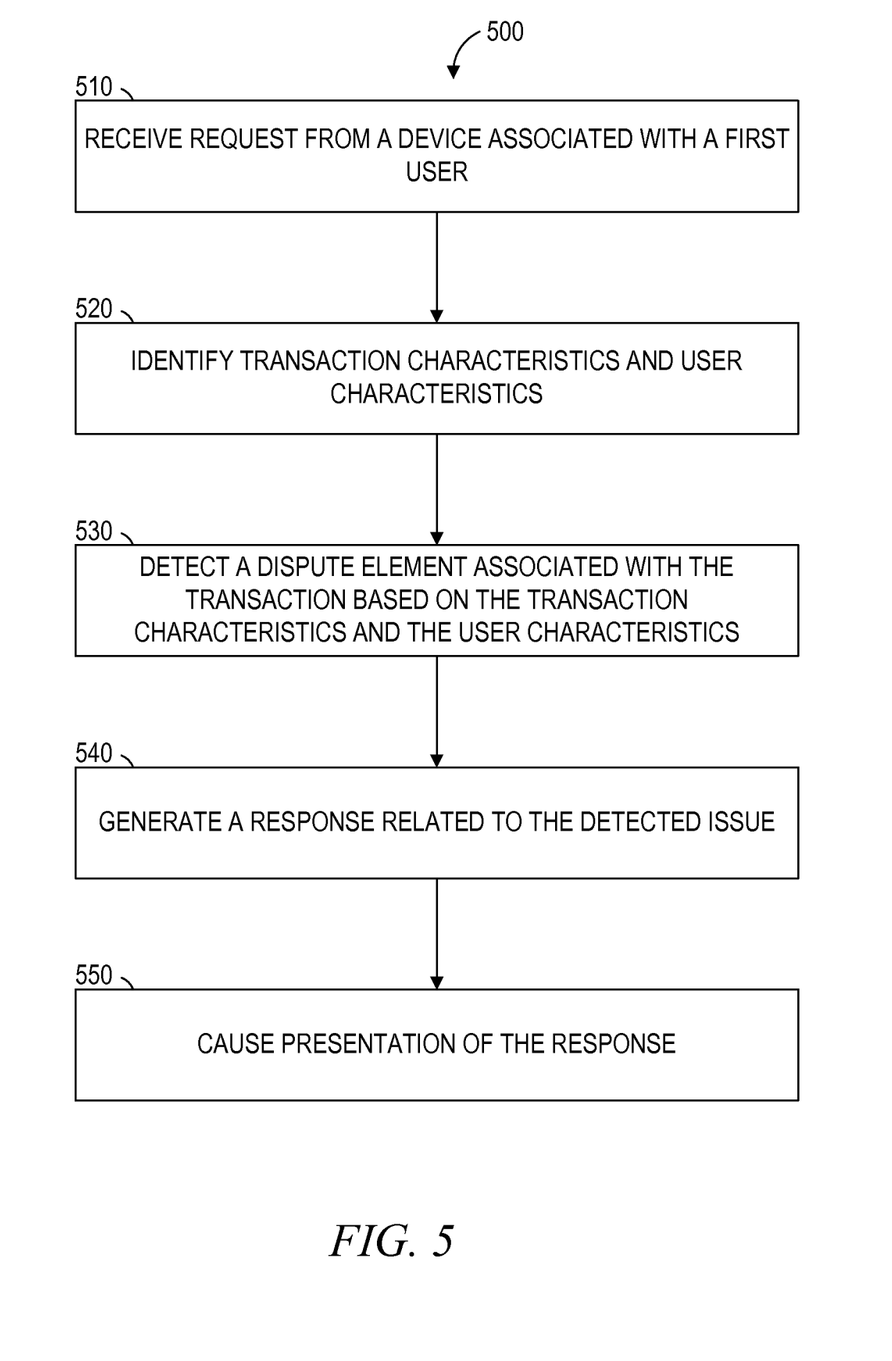
FIG. 5-8 are flowcharts illustrating operations of a server machine in performing a method of presenting a response to an issue related to a transaction, according to some example embodiments.

FIG. 5-8 are flowcharts illustrating operations of the server machine 110 in performing a method 500 of presenting a response to an issue related to a transaction, according to some example embodiments. Operations in the method 500 may be performed by the server machine 110, using modules described above with respect to FIG. 2. As shown in FIG. 5, the method 500 includes operations 510, 520, 530, 540, and 550.

At operation 510, the reception module 210 receives a request from a device associated with a first user. The request may be to access a customer service page that displays information related to a transaction between the first user and a second user. Moreover, the request may be trigged from the first user operating a control displayed on the device. The control may be a link to the customer service page.

At operation 520, the identification module 220 identifies transaction characteristics and user characteristics. The transaction characteristics may indicate an event that occurs during the transaction. Other examples of transaction characters may also include a type of transaction and pending actions in the transaction.

At operation 530, the issue detection module 230 detects an issue (e.g., dispute element) that arises from the transaction based on the transaction characteristics and the user characteristics. The dispute element may be associated with the transaction. In some instances, the issue may not have yet occurred. In other instances, the first user may be currently experiencing the issue in the transaction with the second user.

At operation 540, the generation module 240 generates a response that addresses the detected issue. For instance, the response may be related to the detected issue. The response may be used to assist the first user on how to handle the issue that the first user is experiencing in the transaction.

At operation 550, the presentation module 250 causes presentation of the generated response. The generated response may be displayed on the device associated with the first user. Moreover, in some instances, the presentation module 250 causes presentation of the response without receiving information about the issue from the device associated with the first user.

Figure 6:
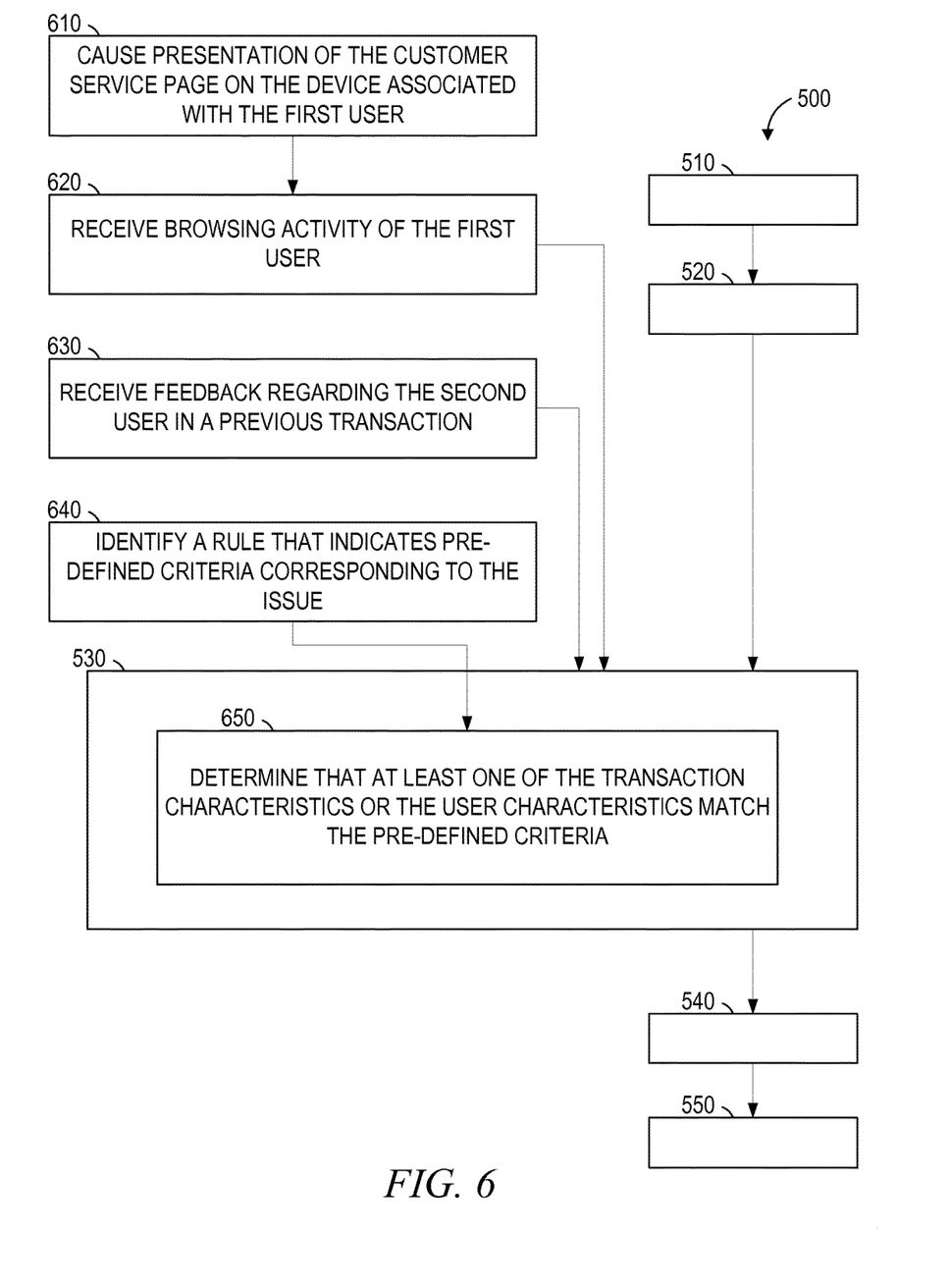

As shown in FIG. 6, the method 500 may include one or more of operations 610, 620, 630, 640, and 650.

At operation 610, the presentation module 250 causes presentation of the customer service page on the device associated with the first user. The customer service page may display information related to the transaction between the first user and the second user. For instance, the first user may access the customer service page in order to receive assistance or help regarding an issue that the first user is currently experiencing in the transaction.

At operation 620, the reception module 210 receives browsing activity of the first user. The browsing activity may comprise interactions of the first user with the customer service page that is displayed on the device associated with the first user.

At operation 630, the reception module 210 receives feedback regarding the second user in a previous transaction. The feedback may include information about the behavior or actions of the second user in the previous transaction.

At operation 640, the identification module 220 identifies a rule that indicates pre-defined criteria corresponding to the issue. The pre-defined criteria may include pre-defined transaction criteria and pre-defined user criteria.

At operation 650, the issue detection module 230 determines that at least one of the transaction characteristics or the user characteristics match with the pre-defined criteria. As stated earlier, the pre-defined criteria may include pre-defined transaction criteria and pre-defined user criteria. Moreover, the issue detection module 230 may determine that a threshold number of transaction characteristics match with the pre-defined transaction criteria or that a threshold number of user characteristics match with the pre-defined user criteria. In each instance, the threshold number may be pre-defined as part of a rule. Moreover, the threshold number may also be adjustable. The operation 650 may be performed as part of operation 530. Further, the operation 650 may be performed based off of the operation 640.

Figure 7:
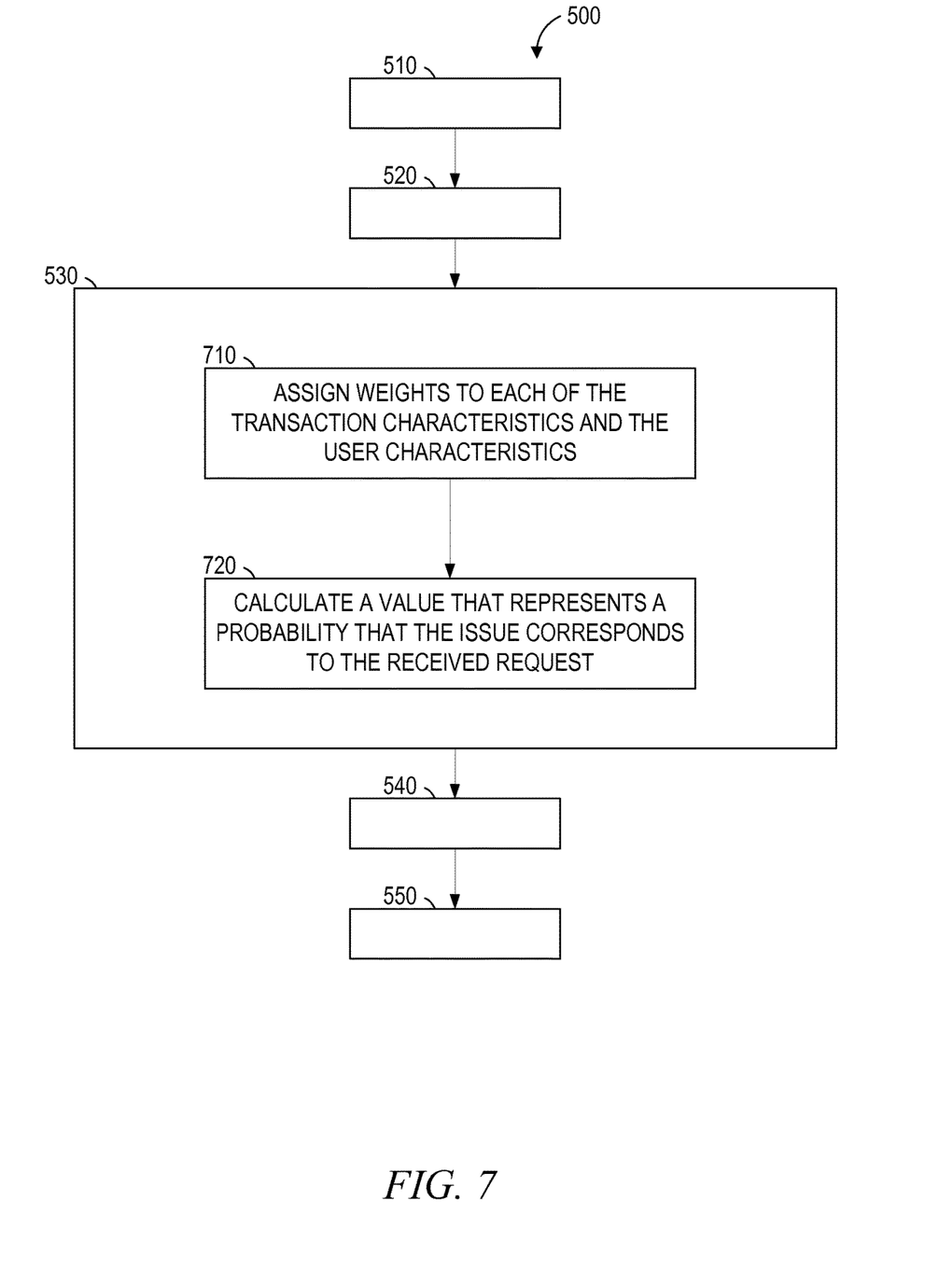

As shown in FIG. 7, the method 500 may include one or more of operations 710, and 720. At operation 710, the issue detection module 230 assigns weights to each of the transaction characteristics and the user characteristics. At operation 720, the issue detection module 230 calculates a value that represents a probability that the issue corresponds to the received request. Each of the operations 710 and 720 may be performed as part of operation 530.

Figure 8:
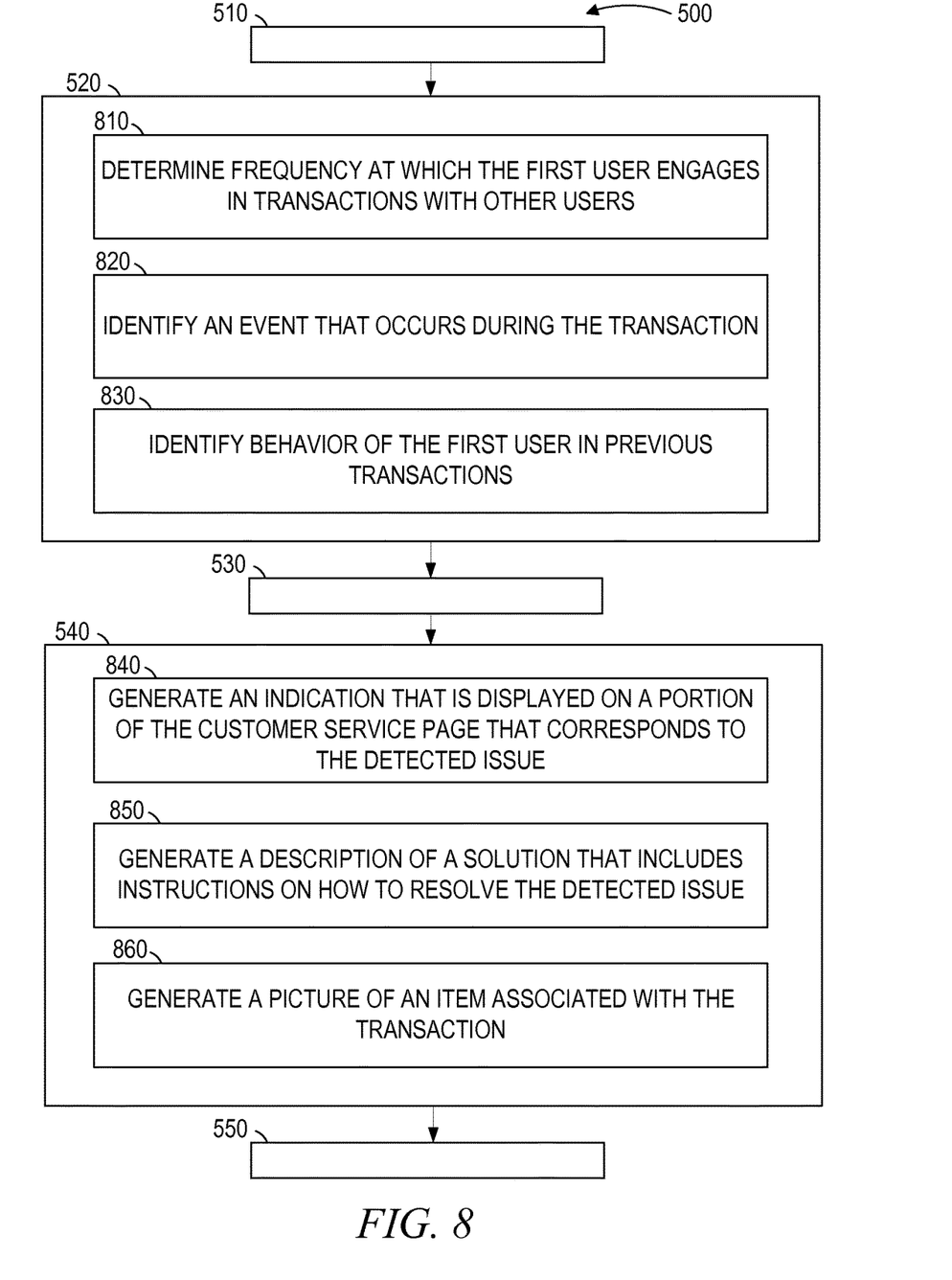

As shown in FIG. 8, the method 500 may include one or more of operations 810, 820, 830, 840, 850, and 860. Each of operations 810, 820, and 830 may be performed as part of operation 520. Each of operations 840, 850, and 860 may be performed as part of operation 540.

At operation 810, the identification module 220 determines a frequency at which the first user engages in transactions with other users. For example, the first user may be a first time seller or buyer. As another example, the first user may be an experienced seller or buyer having participated in a threshold amount of previous transactions.

At operation 820, the identification module 220 identifies an event that occurs during the transaction. An event may include an item being sold or purchased, an item being shipped, a claim being made for an item, a claim being escalated by a user, a purchase of an item, transfer of currency, and the like.

At operation 830, the identification module 220 identifies behavior of the first user in previous transactions. The behavior of the first user in previous transactions may include timeliness of the first user in the previous transactions. The behavior of the first user may also include actions of the first user in the previous transactions.

At operation 840, the generation module 240 generates an indication that is displayed on a portion of the customer service page that corresponds to the detected issue.

At operation 850, the generation module 240 generates a description of a solution that includes instructions on how to resolve the detected issue.

At operation 860, the generation module 240 generates a picture of an item associated with the transaction.

According to various example embodiments, one or more of the methodologies described herein may facilitate presentation of a response to an issue related to a transaction.

When these effects are considered in aggregate, one or more of the methodologies described herein may obviate a need for certain efforts or resources that otherwise would be involved in the presentation of a response to an issue related to a transaction. Efforts expended by a user in resolve the issue related to the transaction may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
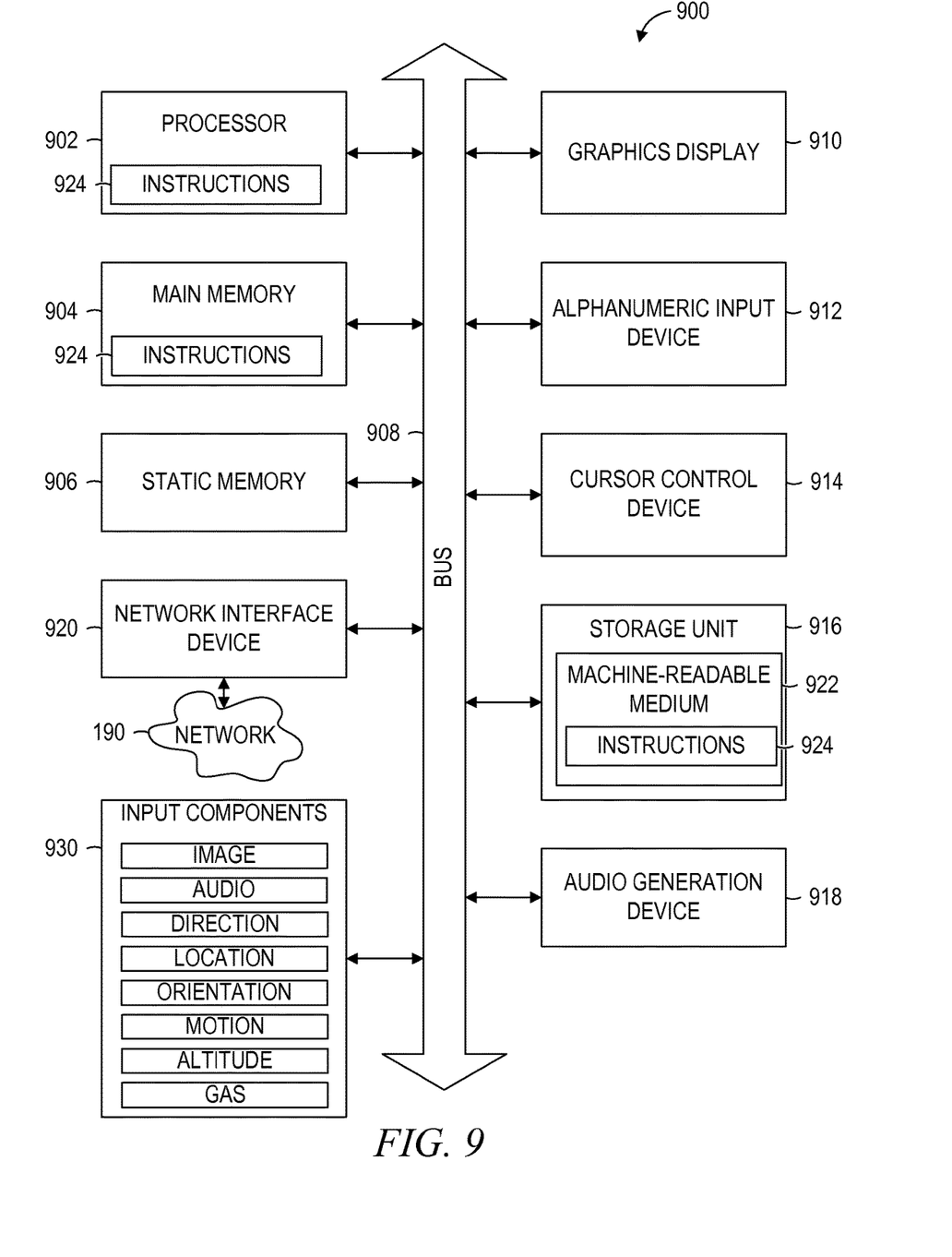
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions 924 from a machine-readable medium 922 (e.g., a non-transitory machine-readable medium, a machine-readable storage medium, a computer-readable storage medium, or any suitable combination thereof) and perform any one or more of the methodologies discussed herein, in whole or in part. Specifically, FIG. 9 shows the machine 900 in the example form of a computer system (e.g., a computer) within which the instructions 924 (e.g., software, a program, an application, an applet, an app, or other executable code) for causing the machine 900 to perform any one or more of the methodologies discussed herein may be executed, in whole or in part.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include any collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, a cathode ray tube (CRT), or any other display capable of displaying graphics or video). The machine 900 may also include an alphanumeric input device 912 (e.g., a keyboard or keypad), a cursor control device 914 (e.g., a mouse, a touchpad, a trackball, a joystick, a motion sensor, an eye tracking device, or other pointing instrument), a storage unit 916, an audio generation device 918 (e.g., a sound card, an amplifier, a speaker, a headphone jack, or any suitable combination thereof), and a network interface device 920.

The storage unit 916 includes the machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered machine-readable media (e.g., tangible and non-transitory machine-readable media). The instructions 924 may be transmitted or received over the network 190 via the network interface device 920. For example, the network interface device 920 may communicate the instructions 924 using any one or more transfer protocols (e.g., hypertext transfer protocol (HTTP)).

In some example embodiments, the machine 900 may be a portable computing device, such as a smart phone or tablet computer, and have one or more additional input components 930 (e.g., sensors or gauges). Examples of such input components 930 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 924 for execution by the machine 900, such that the instructions 924, when executed by one or more processors of the machine 900 (e.g., processor 902), cause the machine 900 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving a request from a device associated with a first user, the request including a request to access a customer service page with information related to a transaction between the first user and a second user;
   identifying transaction characteristics of the transaction between the first user and the second user and user characteristics of the first user;
   detecting, using one or more processors, a dispute element associated with the transaction between the first user and the second user based on the transaction characteristics and the user characteristics of the first user;
   generating a response related to the detected dispute element; and
   causing presentation of the response related to the detected dispute element on the device associated with the first user, wherein the presentation of the response related to the detected dispute element is caused without receiving information about the dispute element from the device associated with the first user.

2. The method of claim 1 further comprising:
   causing presentation of the customer service page on the device associated with the first user in response to the request; and
   receiving browsing activity of the first user with the customer service page from the device associated with the first user, and wherein the detecting the dispute element is further based on the received browsing activity of the first user with the customer service page.

3. The method of claim 1, wherein the identifying the user characteristics of the first user includes determining a frequency at which the first user engages in transactions with other users.

4. The method of claim 1, wherein the identifying the transaction characteristics of the transaction includes identifying an event that occurs during the transaction.

5. The method of claim 1, wherein the identifying the user characteristics of the first user includes identifying behavior of the first user in previous transactions.

6. The method of claim 1 further comprising:
   identifying a rule that indicates pre-defined criteria corresponding to the dispute element, and wherein the detecting the dispute element includes determining that at least one of the transaction characteristics or the user characteristics match with the pre-defined criteria.

7. The method of claim 1, wherein the detecting the dispute element based on the transaction characteristics and the user characteristics includes calculating a value that represents a probability that the dispute element corresponds to the received request.

8. The method of claim 7, wherein the detecting the dispute element based on the transaction characteristics and the user characteristics includes assigning weights to each of the transaction characteristics and the user characteristics, and wherein the calculating the value is based on the assigned weights.

9. The method of claim 1, wherein the generating the response includes generating an indication that is displayed on a portion of the customer service page that corresponds to the detected dispute element.

10. The method of claim 1, wherein the generating the response includes generating a description of a solution that includes instructions on how to resolve the detected dispute element.

11. The method of claim 1, wherein the generating the response includes generating a picture of an item associated with the transaction between the first user and the second user.

12. The method of claim 1, wherein, further comprising:
receiving feedback regarding the second user in a previous transaction, and wherein the detecting the dispute element is further based on the feedback regarding the second user in the previous transaction.

13. A system comprising:
a reception module configured to receive a request from a device associated with a first user, the request including a request to access a customer service page with information related to a transaction between the first user and a second user;
an identification module configured to identify transaction characteristics of the transaction between the first user and the second user and user characteristics of the first user;
an issue detection module configured to detect a dispute element associated with the transaction between the first user and the second user based on the transaction characteristics and the user characteristics of the first user;
a generation module configured to generate a response related to the detected dispute element; and
a presentation module configured to cause presentation of the response related to the detected dispute element on the device associated with the first user, wherein the presentation of the response related to the detected dispute element is caused without receiving information about the dispute element from the device associated with the first user.

14. The system of claim 13, wherein the presentation module is further configured to cause presentation of the customer service page on the device associated with the first user in response to the request, and wherein the reception module is further configured to receive browsing activity of the first user with the customer service page from the device associated with the first user, and wherein the issue detection module is further configured to detect the dispute element based on the received browsing activity of the first user with the customer service page.

15. The system of claim 13, wherein the identification module is further configured to determine a frequency at which the first user engages in transactions with other users.

16. The system of claim 13, wherein the identification module is further configured to identify a rule that indicated pre-defined criteria corresponding to the dispute element, and wherein the issue detection module is further configured to determine that at least one of the transaction characteristics or the user characteristics match with the pre-defined criteria.

17. The system of claim 13, wherein the generation module is further configured to generate an indication that is displayed on a portion of the customer service page that corresponds to the detected dispute element.

18. A non-transitory machine-readable medium storing instructions that, when executed by one or more processors of a machine, cause the machine to perform operations comprising:
receiving a request from a device associated with a first user, the request including a request to access a customer service page with information related to a transaction between the first user and a second user;
identifying transaction characteristics of the transaction between the first user and the second user and user characteristics of the first user;
detecting a dispute element associated with the transaction between the first user and the second user based on the transaction characteristics and the user characteristics of the first user;
generating a response related to the detected dispute element; and
causing presentation of the response related to the detected dispute element on the device associated with the first user, wherein the presentation of the response related to the detected dispute element is caused without receiving information about the dispute element from the device associated with the first user.

* * * * *